US006973089B1

(12) United States Patent
Linsky et al.

(10) Patent No.: US 6,973,089 B1
(45) Date of Patent: Dec. 6, 2005

(54) BEAM HOPPING SELF ADDRESSED PACKET SWITCHED COMMUNICATION SYSTEM WITH LOCALLY INTELLIGENT SCHEDULING

(75) Inventors: Stuart T. Linsky, San Pedro, CA (US); Lisa A. Moy-Yee, Torrance, CA (US); Scott A. Cooper, Torrance, CA (US); Reginald Jue, Manhattan Beach, CA (US); Vincent Nguyen, Garden Grove, CA (US); Kevin M. Yasui, Redondo Beach, CA (US); Andrew T. Nguyen, Orange, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1177 days.

(21) Appl. No.: 09/599,041

(22) Filed: Jun. 21, 2000

(51) Int. Cl.[7] ............... H04L 12/56; H04B 7/00; H04Q 7/00
(52) U.S. Cl. ............... 370/395.31; 370/310.2; 370/329
(58) Field of Search ............... 370/310.1, 310.2, 370/328–329, 395.1, 395.3–395.31, 428, 370/389, 391–392

(56) References Cited

U.S. PATENT DOCUMENTS 5,796,715 A * 8/1998 Patterson et al. ............ 370/349
5,905,443 A   5/1999 Olds et al. ............ 340/825.21
6,512,749 B1 * 1/2003 Wright et al. ............ 370/316

6,597,669 B1 * 7/2003 Takahashi et al. ............ 370/325

FOREIGN PATENT DOCUMENTS

CA          2308350          11/1998

OTHER PUBLICATIONS

Goldstein et al.; "GRS: A Dynamic GBS Downlink Beam Scheduling Tool"; Mar. 6, 1999; pp. 3-13; XP010350242.
Tassiulas et al.; "A Dynamic Scheduling Problem in Packet Switched Satellite Networks"; Dec. 14, 1994; pp. 2079-2084.
Bourret et al.; "Optimal Scheduling by Competitive Activation: Application to the Satellite Antennae Scheduling Problem"; Jun. 18, 1989; pp. 565-572; XP010087704.
Hung et al.; "ATM via Satellite: A Framework and Implementation"; Apr. 15, 1996; pp. 1-22.

* cited by examiner

*Primary Examiner*—Chi Pham
*Assistant Examiner*—Ronald Abelson
(74) *Attorney, Agent, or Firm*—Posz Law Group, PLC

(57) ABSTRACT

A downlink frame processing system (200) includes a packet switch (608) routing self addressed uplink data (706) from an input port to an output port, a memory (804) coupled to the output port, and a downlink scheduler (802) coupled to the memory (804). The memory (804) includes storage for at least two downlink beam hop locations (302, 304). The downlink scheduler (802) processes from one of a plurality of segments at least one scheduling entry (1312) that includes, for example, a header field (1316) defining at least one of a payload and frame type (1404) for at least one of a payload and frame (1200) to be transmitted, and payload data pointers (1502, 1504, 1506) into the memory (804).

21 Claims, 15 Drawing Sheets

| 10 | 9 | 8 | 7 | 6 | 5 | 4 | 3 | 2 | 1 | 0 |
|---|---|---|---|---|---|---|---|---|---|---|
| | | | Frame Offset | | | | Beam B frame type | | Beam A frame type | |

1402 — Frame Offset
1404 — Beam B frame type
1406 — Beam A frame type
1400

Figure 14

| 10 | 9 | 8 | 7 | 6 | 5 | 4 | 3 | 2 | 1 | 0 |
|---|---|---|---|---|---|---|---|---|---|---|
| Subclass | | | | H/L | Priority | | | | EOF | EOT |

1502 — Subclass
1504 — H/L
1506 — Priority
1508 — EOF
1510 — EOT
1500

Figure 15

| 10 | 9 | 8 | 7 | 6 | 5 | 4 | 3 | 2 | 1 | 0 |
|---|---|---|---|---|---|---|---|---|---|---|
| Subclass | | | | | Priority | | | | EOF | EOT |

1602 — Subclass
1604 — Priority
1606 — EOF
1608 — EOT
1600

Figure 16

BEAM HOPPING SELF ADDRESSED PACKET SWITCHED COMMUNICATION SYSTEM WITH LOCALLY INTELLIGENT SCHEDULING

CROSS-REFERENCE TO RELATED APPLICATIONS

This application is related to, titled "Beam Hopping Self Addressed Packet Switched Communication System with Multi-port Memory", filed Jun. 21, 2000 as Ser. No. 09/599,035 (now abandoned), titled "Beam Hopping Self Addressed Packet Switched Communication System with Power Gating", filed Jun. 21, 2000 as Ser. No. 09/599,041; titled "Beam Hopping Self Addressed Packet Switched Communication System with Multiple Beam Array Antenna", filed Jun. 21, 2000 as Ser. No. 09/599,150.

BACKGROUND OF THE INVENTION

The present invention relates to satellite communication systems. In particular, the present invention relates to processing of frames for transmission in a satellite downlink.

As terrestrial communication networks advance and evolve, there is an increasing need to route data through satellite links to connect individuals and organizations on a global level. The enormous cost of developing, building, and flying satellite hardware, however, typically prevents that hardware from providing capabilities well matched to state of the art terrestrial networks. Thus, for example, past satellites were ill-equipped to handle Asynchronous Transfer Mode network traffic except in a rudimentary manner.

The lack, in prior satellites, of a flexible and sophisticated approach to processing uplink data, building downlink frames, and transmitting the frames prevented past satellites from operating as a fully functional extension of a terrestrial network. As a result, the full potential of the terrestrial network, its data formats, and protocols, were not realized when transmitting network data through a satellite link. The overall effectiveness in distributing information globally was therefore hampered.

A need exists in the industry for a satellite communication system that addresses the problems noted above and others previously experienced.

BRIEF SUMMARY OF THE INVENTION

A preferred embodiment of the present invention provides a downlink frame processing system for a satellite. The frame processing system includes a packet switch routing self addressed uplink data from an input port to an output port, a memory coupled to the output port, and a downlink scheduler coupled to the memory.

The memory includes storage (e.g., queues) for at least two downlink beam hop locations. The downlink scheduler processes at least one scheduling entry that includes, for example, a header field defining at least one of a payload and frame type for at least one of a payload and frame to be transmitted, and payload data pointers into the memory.

The downlink scheduler may store several scheduling tables in different scheduling segments in memory. One of the segments may be made the active segment, for example, upon command from a Network Control Center (NCC). The remaining segments are then inactive. As examples, the payload data pointers may be queue pointers. The queue pointers may then be indicative of downlink beam hop location, priority, code rate, and the like.

In other words, the frame processing system segregates incoming data according to hop location, priority, and code rate. The scheduler then consults a header field to determine a hop location and a code rate for a frame to be transmitted. The scheduler then consults a data pointer list that determines the priority queues from which data is provided to fill frame payloads.

Another preferred embodiment of the present invention provides a method for preparing downlink frames for transmission in a satellite downlink. The method includes switching self addressed uplink data from a switch input port to a switch output port, allocating, in a memory, storage for at least two downlink beam hop locations, and forming downlink frames by processing a downlink schedule comprising at least one scheduling entry that includes a header field defining at least one of a payload and frame type for at least one of a payload and frame to be transmitted, and processing payload data pointers into the memory.

As noted above, the memory may store a first downlink beam hop location queue and a second downlink beam hop location queue. Similarly, the method may process an active scheduling segment for a period of time, deactivate the current scheduling segment on command, and activate a different scheduling segment. In processing the queue pointers, the method may pull cells from queues characterized by one or more of downlink beam hop location, priority, and code rate. Furthermore, when a queue pointed to by a queue pointer is empty, the method may instead service a different queue, as explained in more detail below.

BRIEF DESCRIPTION OF THE DRAWINGS

FIG. 6 shows an implementation of a router.

FIG. 14 illustrates a frame header.

FIG. 15 depicts a code rate mode cell entry definition.

FIG. 16 shows a fenced mode cell entry definition.

DETAILED DESCRIPTION OF THE INVENTION

Figure 1:
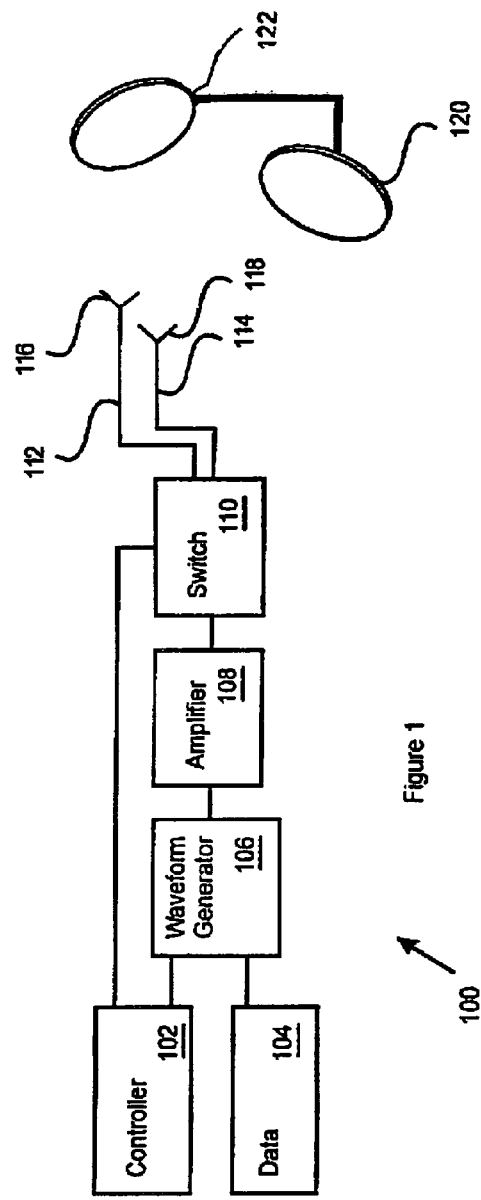
FIG. 1 illustrates a block diagram of a bandwidth switch with waveform processing chain.

Turning now to FIG. 1, that figure shows a block diagram of a downlink beam processing system or bandwidth switch 100. The bandwidth switch 100 includes a controller 102 and a waveform processing chain that operates on data provided by the data source 104. In particular, the waveform processing chain includes a waveform generator 106, an amplifier 108, and a feed switch 110. The waveform processing chain further includes a first feed path 112 and a second feed path 114 that may be characterized by a polarization effect on the waveform that propagates along the feed paths 112–114. The polarization effect may induce, for example, clockwise (right) or counter clockwise (left) polarization in the waveform.

The first feed path 112 terminates in a first radiating element 116 (e.g., a feed horn). Similarly, the second feed path terminates in a second radiating element 118 (e.g., another feed horn). The first and second feed horns 116, 118 illuminate the subreflector 120. The subreflector 120, in turn, illuminates the main reflector 122 that projects downlink beams onto terrestrial cells. Thus, the first and second feed horns 116, 118, the subreflector 120, and the main reflector 122 form a Multiple Beam Array Antenna (MBA) to direct spot beam coverage to distinct terrestrial cells. Additional feed horns may be used with the MBA to generate additional spot beams, and multiple independent MBAs may be provided.

The waveform generator 106 accepts baseband data from the data source 104 and creates a waveform to be transmitted (after amplification by the amplifier 108). The switch 110 selects the particular feed path 112–114 along which the waveform propagates (and thus, in certain embodiments, the polarization and/or hop location associated with the waveform).

The controller 102 exercises color control over the waveform to be transmitted. Thus, the controller 102 may output one or more control signals (collectively referred to as a color selection signal) that determine, for example, the frequency, polarization, or hop location of the waveform to be transmitted. In the preferred embodiment, the beam color components include Even and Odd hop locations, Left and Right polarization, and first and second frequencies. Eight different colors are therefore available: 1EL, 1ER, 1OL, 1OR, 2EL, 2ER, 2OL, 2OR.

Figure 2:
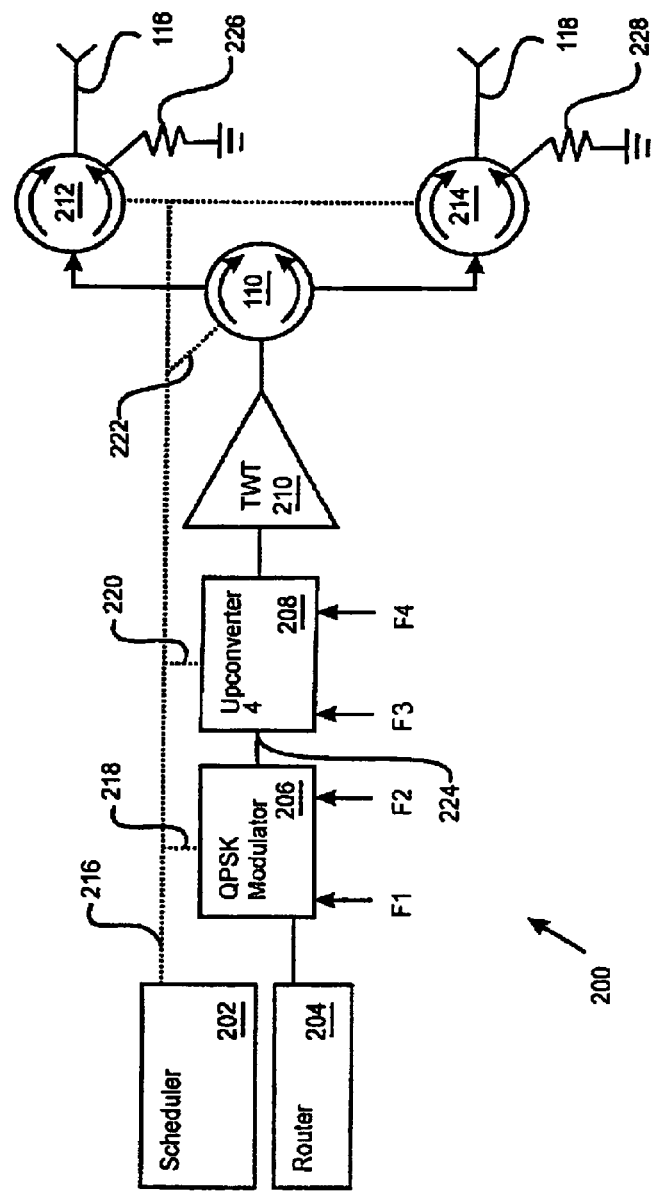
FIG. 2 shows a detailed block diagram of a bandwidth switch with waveform processing chain.

With regard to FIG. 2, a more specific implementation of a downlink beam processing system and bandwidth switch 200 is shown. The bandwidth switch 200 includes a data scheduler 202, a data router 204, and a waveform processing chain including a QPSK modulator 206, an upconverter 208, and a traveling wave tube amplifier (TWTA) 210. The switch 110 is illustrated in FIG. 2 as a ferrite switch 110 that directs the waveform to be transmitted through either the first feed path 112 or the second feed path 114. Preferably, additional ferrite switches 212 and 214 in the feed paths 112–114 provide additional signal isolation (e.g., approximately 20 db between input and output when the ferrite switch is off). The additional ferrite switches 212–214 operate under control of the color selection output to pass or block a waveform to be transmitted through the feed paths 112–114. In other words, when the waveform to be transmitted is destined for the feed 112, then the ferrite switch 214 is coupled through the load 228 to ground. Similarly, when the waveform to be transmitted is destined for the feed 114, then the ferrite switch 212 is coupled through the load 226 to ground.

In addition, FIG. 2 shows a color selection output 216, two frequency selection inputs 218 and 220, a feed path selection input 222, and an intermediate waveform output 224.

During operation, the bandwidth switch 200 accepts baseband data from the router 204 (e.g., an Asynchronous Transfer Mode (ATM) cell router), and creates a waveform to be transmitted using the waveform processing chain. The waveform processing starts by directly converting baseband I and Q data to an intermediate frequency of, for example, 750 MHz. The waveform processing then selects one of F1 (e.g., 3.175 MHz) and F2 (e.g., 3.425 MHz) and one of F3 (e.g., 16 GHz) and F4 (e.g., 17.4 GHz) to produce a waveform to be transmitted with a final center frequency at one of 18.425 GHz, 18.675 GHz, 19.825 GHz, and 20.075 GHz. The scheduler 202 monitors the propagation of data through the waveform processing chain and determines the color of the waveform to be transmitted. To that end, the scheduler 202 provides the color selection output 216 that indicates, as examples, the frequency, polarization, and hop location for the waveform to be transmitted.

The TWTA 210 amplifies the waveform to be transmitted, while the switch 110 determines along which feed path 112–114 (or additional feed paths) the amplified waveform will propagate. To that end, the switch 110 includes the feed path selection input 222 responsive to information on the color selection output 216 (e.g., a hop selection signal). Because the feed paths 112–114 are generally (though not necessarily) associated with feed horns that produce spot beams in different hop locations, the hop selection signal acts to determine the hop location of the waveform to be transmitted. The hop locations below are designated Even or Odd, but are not restricted to even or odd frames. Instead Even and Odd generally designate mutually exclusive time periods.

In addition, either of the feed paths 112–114 may be characterized by a polarization effect on the waveform that propagates along the feed path. Thus, the color selection output 216 may also determine the polarization color component of the waveform to be transmitted. Optionally, however, separate feed paths may be provided for any number of desired combinations of polarization and hop location. The transmitted waveform manifests itself as a beam spot that, typically, provides downlink bandwidth for a terrestrial cell.

The bandwidth switch 200 may operate onboard a first satellite that supports a cellular coverage area using a set of spot beams. The scheduler 202 ensures that the waveforms to be transmitted have the appropriate beam colors to minimize co-channel, adjacent channel, and cross polarization for the cellular coverage area and the eight possible beam colors. However, when, for example, a second subsequently launched satellite begins to provide bandwidth support for the same cellular coverage area, the bandwidth switch 200 allows the first satellite to modify its beam colors to accommodate the second satellite. In other words, the bandwidth switch 200 allows the first and second assignment of spot beams to the coverage area to coexist in a minimally interfering manner. The resultant beam laydown may then be minimally interfering initially for a single satellite, and later reconfigured to be minimally interfering with regard to a particular type of interference or interferences for additional satellites providing bandwidth for the same coverage area.

Figure 3:
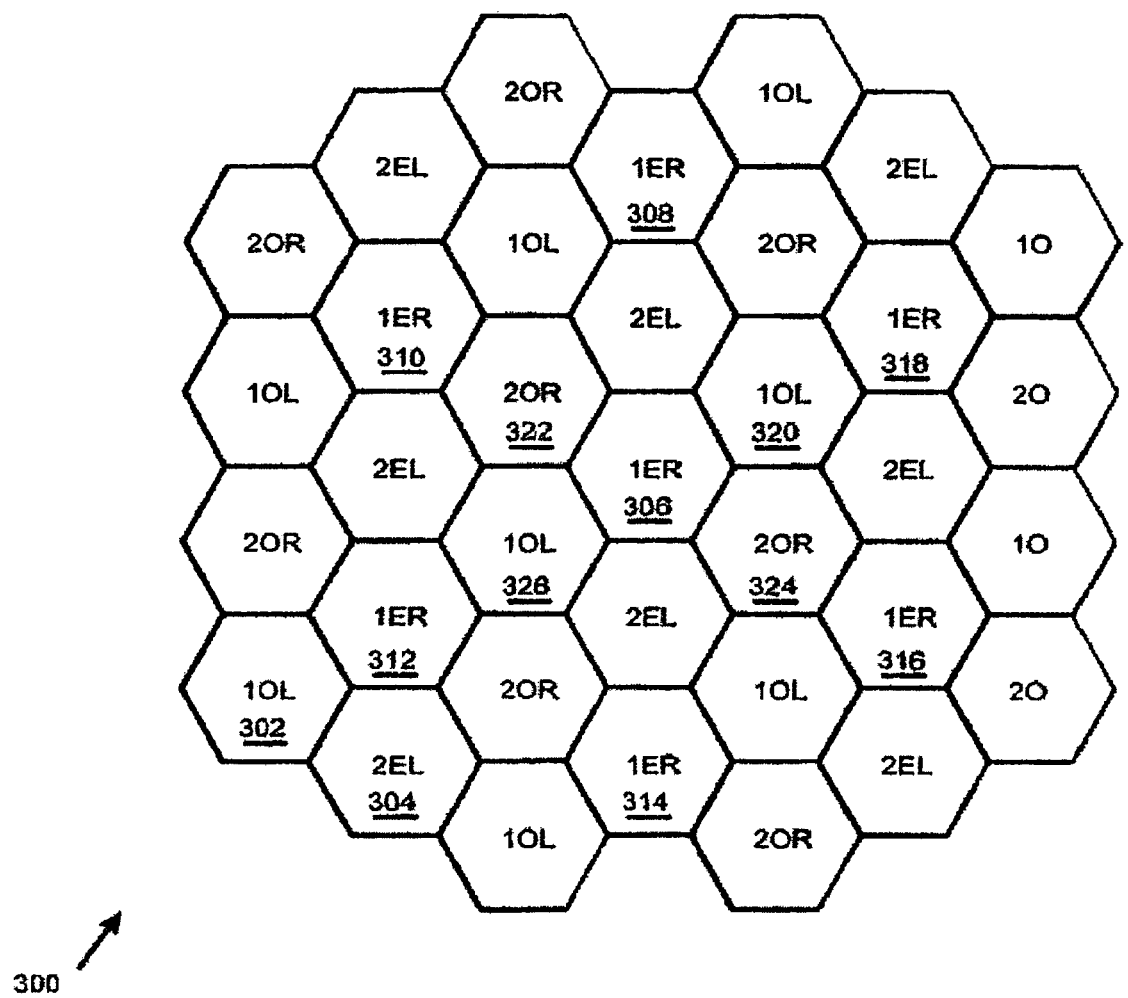
FIG. 3 illustrates a beam laydown showing both even and odd hop downlink beam color assignments.

Turning next to FIG. 3, that figure illustrates a beam laydown 300 that uses hopping beams. The coverage area is generally divided into cells as shown in idealized form, for example, by the hexagonal cells 302 and 304. Each of the cells is also labeled with a beam color. For example, a beam of color 10L provides bandwidth for the cell 302, while a beam of color 2EL provides bandwidth for the cell 304.

The laydown 300 is characterized in that, for mutually exclusive hop locations, only six co-channel interferers (CCI) (caused by a beam of the same color), zero adjacent channel interferers (ACI) (caused by a beam differing in only one color component), and zero cross polarization interferers (XPI) (caused by a beam differing only in polarization) exist for any given cell. In other words, taking cell 306 (color 1ER) as an example, the CCIs are cells 308, 310, 312, 314, 316, and 318.

Note that cell 320 does not provide CCI because it has an odd color component and is not provided with spot beam energy at the same time as the cell 306 (color 1ER) (i.e., the hop locations are mutually exclusive). The laydown 300 also provides minimal interference when hop locations are non-mutually exclusive. In the non-mutually exclusive case, there exist only 6 CCIs, 2 ACIs, and 2 XPIs. The ACIs are cells 322 and 324, while the XPIs are cells 320 and 326. Note that not all colors (e.g., 2OL) need be used in a beam hopping beam laydown.

Figure 4:
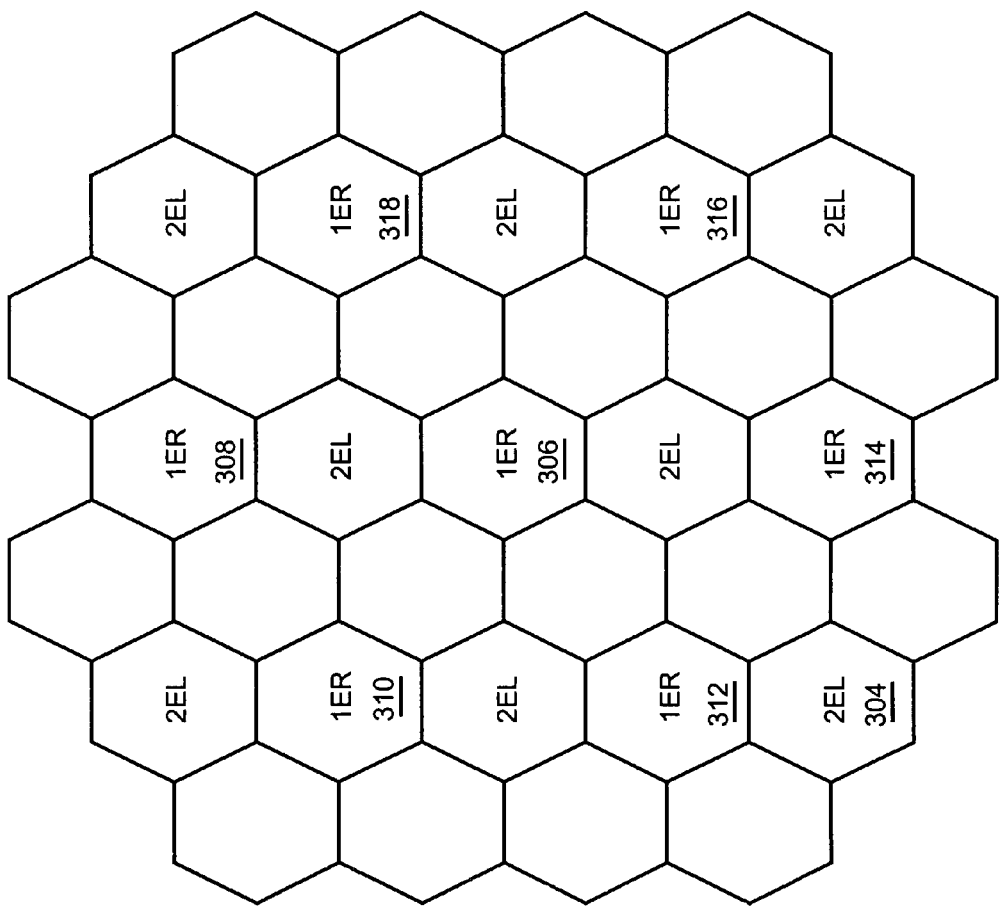
FIG. 4 shows the even hop downlink beams from the beam laydown of FIG. 3.
Figure 5:
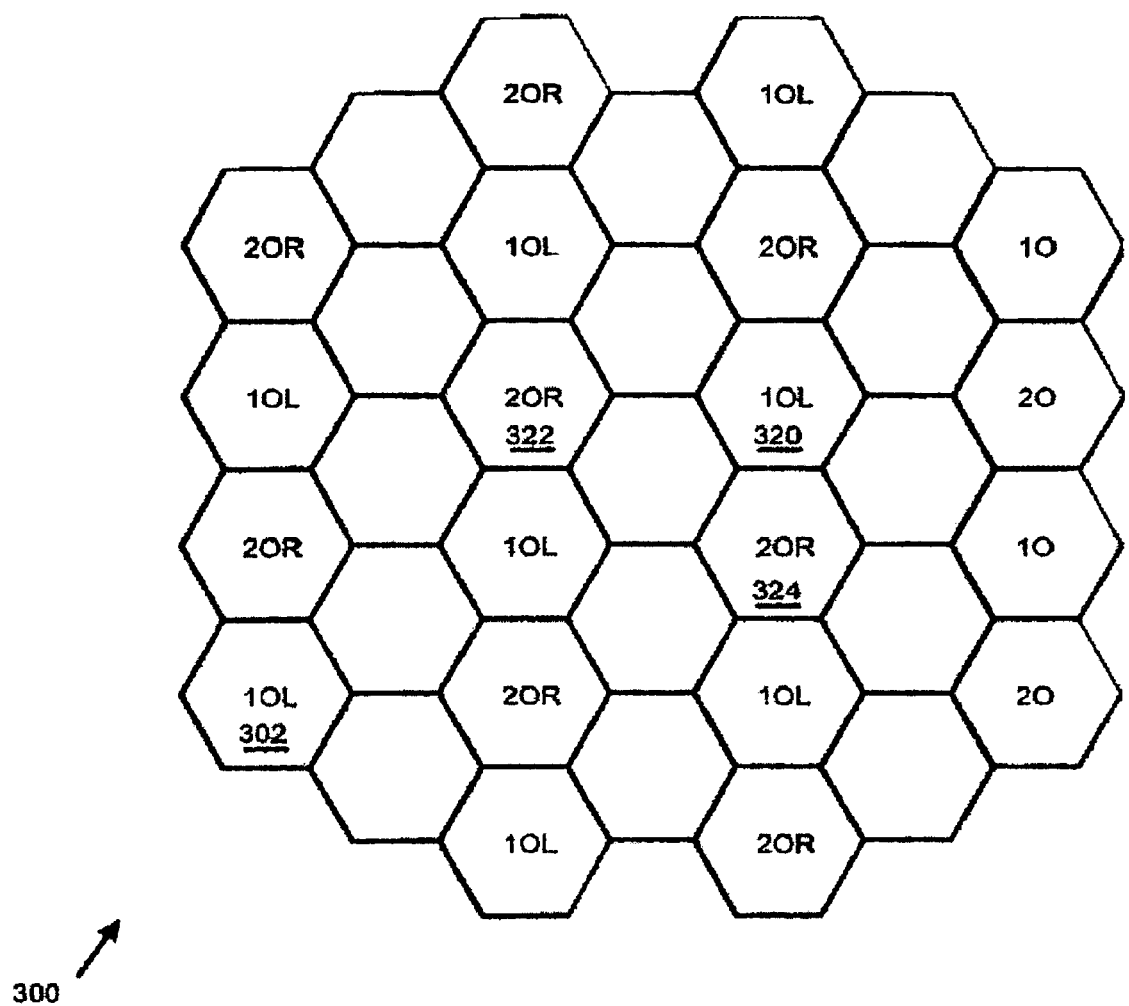
FIG. 5 depicts the odd hop downlink beams from the beam laydown of FIG. 3.

FIG. 4 shows the laydown 300 as well. In FIG. 4, however, only the even hop locations are marked. Similarly, FIG. 5 shows the beam laydown 300 with only the odd hop locations marked.

Turning next to FIG. 6, a preferred implementation of a router 600 is illustrated. The router 600 includes thirty-five inbound modules (IBMs), three of which are designated 602, 604, 606. The IBMs 602–606 are coupled to input ports of an ATM cell switch 608. The ATM cell switch 608 has thirty-three outputs coupled to individual outbound modules (OBMs), three of which are designated 610, 612, 614. pairs of uplink demodulators feed each IBM 602–606, while the OBMs 610–614 feed downlink modulators.

The router 600 provides a self addressed packet switching function. In other words, the router 600 uses addressing or destination information present in uplink data (e.g., ATM cells) to deliver the cells to a specific data queue that feeds a downlink beam appropriate for the destination or next hop of the cell. Thus, for example, the VPI/VCI fields in an ATM cell may be used to guide the cell into an appropriate downlink queue. Cells may first be discarded however, if they fail their header error check.

The output of the IBMs 602–606 includes a routing tag, a queue tag, and the (possibly modified) cell itself. The role of the IBMs 602–606, the routing tag and, the queue tag will be described in more detail below with respect to FIG. 7. In general, the ATM cell switch 608 uses the bits in the routing tag to connect a cell switch input port to a cell switch output port. The queue tag, a portion of the routing tag, and the cell itself then flow through the switch to the OBM connected to the selected output port. As will be described in more detail below, each OBM 610–614 includes a set of downlink queues that feed downlink beams directed to predetermined terrestrial cells. The queue tag determines in which downlink queue the cell will be inserted in the OBM (and may be indicative of cell priority and downlink coding rate). Thus, the IBMs 602–606, the ATM cell switch 608, and the OBMs 610–614 operate in concert to deliver cells to an appropriate downlink queue in a self addressed manner.

Figure 7:
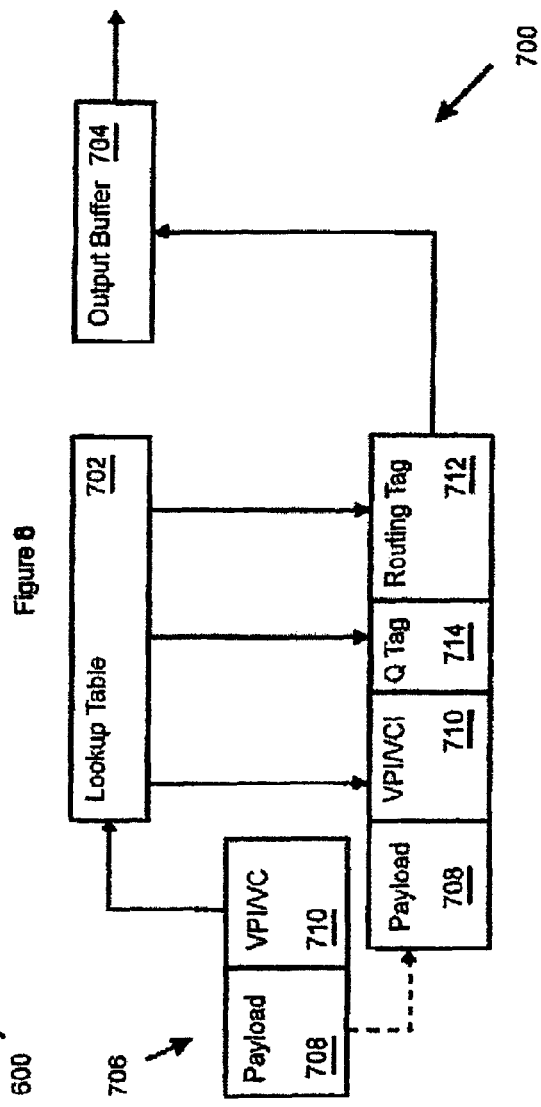
FIG. 7 shows an implementation of an inbound module.
Figure 8:
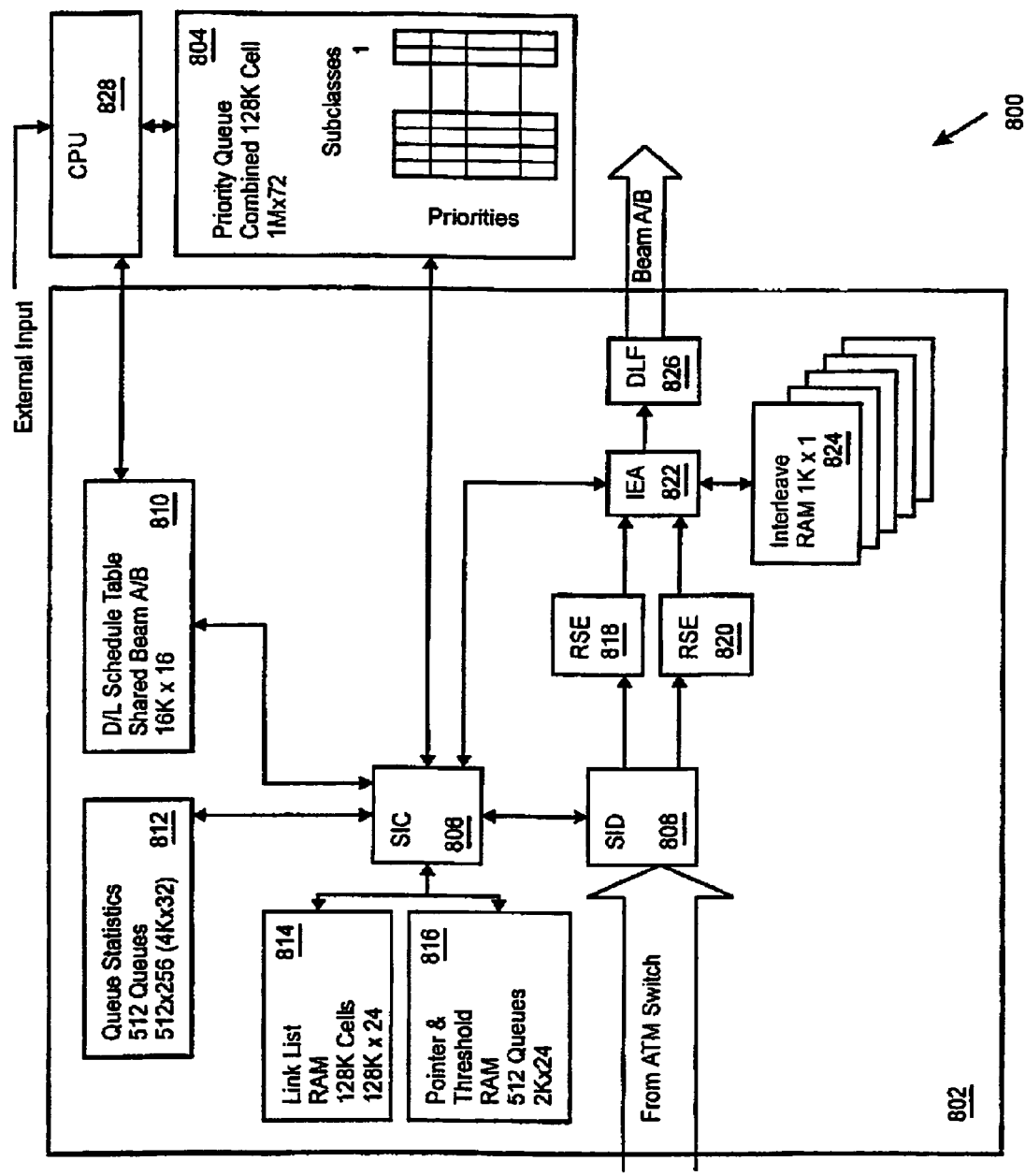

FIG. 7 illustrates an implementation 700 of the IBMs 602–606. In particular, the implementation 700 includes a routing or lookup table 702 and an output buffer 704. An incoming ATM cell generally indicated at 706 is shown to include (among other fields) a payload 708 and a VPI/VCI address 710. FIG. 7 also illustrates a particular routing tag 712, queue tag 714, and optional replacement VPI/VCI 716 field for the cell from among those stored in the routing table 702. If the cell is modified (e.g., by changing its VPI/VCI), the IBM will also recompute the cell header error check. A ground based Network Control Center (NCC) may dynamically update the routing table 702 to ensure proper routing of cells from the current network node (e.g., the satellite) to the next network node (e.g., a ground terminal).

The VPI/VCI 710 of the cell 706 addresses the routing table 702. In response, the routing table 702 provides the routing tag 712, queue tag 714, and new VPI/VCI addresses 716 (e.g., for the next hop that the cell will make). A NULL entry in the routing table 702 may indicate that the cell is to be discarded. Any modifications to the uplink cell result in the IBM recomputing an error check for the uplink cell as well. This information enters the output buffer 704 (which may be, for example, 8191 cells in length). Once in the output buffer 704, the information awaits selection by an arbitration algorithm before it enters the cell switch 608. As examples, the arbitration algorithm may give preference to the oldest cells (e.g., using a two bit quantization of clock cycle cell age), the remaining capacity of the output buffer 704 (e.g., using a three bit quantization of total input queue size), and the like.

Once the cell is selected, its routing tag is used to send the cell to an associated output port of the cell switch 608. In particular, the routing tag 712 is preferably seven bits in length. The ATM cell switch 608 uses six of the seven bits internally to connect an input port to an output port determined by the six bits. For future expandability, the seventh bit may be used, for example, to support larger switches with additional output ports.

Figure 8:
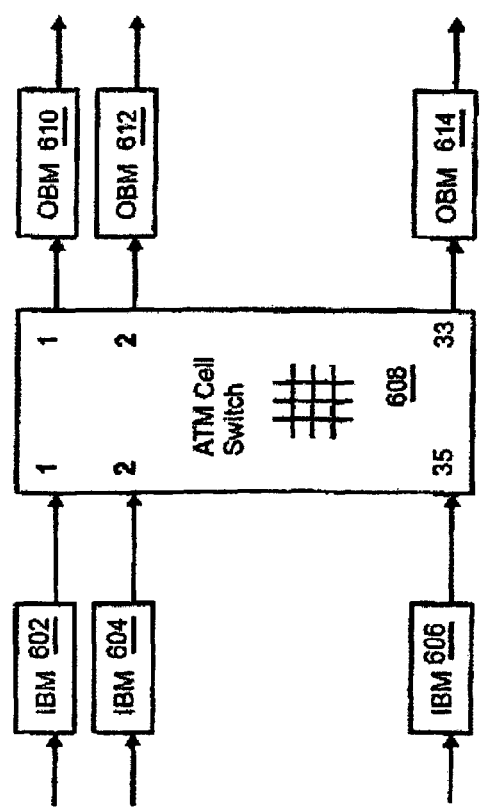
FIG. 8 illustrates an implementation of an outbound module.

Turning now to FIG. 8, that figure illustrates an implementation of an OBM 800 that functions, for example, as a downlink frame scheduler. The OBM 800 includes an OBM controller 802 coupled to an external cell memory 804. The OBM controller 802 integrates, preferably, into a single ASIC logic that implements a switch interface controller (SIC) 806 and a switch interface data handler (SID) 808. The SIC 806 couples to a downlink schedule table 810, a queue statistics memory 812, a linked list memory 814, and a pointer memory 816. In addition, the OBM 800 includes a first Reed-Solomon encoder (RSE) 818, a second RSE 820, interface electronics (IEA) 822 coupled to interleaving memory 824, and a downlink frame formatter (DLF) 826.

The external cell memory 804 is preferably organized into numerous queues. The queues may be distinguished by characteristics such as hop location, priority, and code rate, or other criteria. In general, for each hop location, there may be one or more code rates, each having one or more priority queues. In one embodiment, there are 16 downlink hop locations (referred to as a subclass) the external cell memory 804 includes 16 light coding queues and 16 heavy coding queues (i.e., 512 total queues). Each of the 16 light and 16 heavy coding queues represents a predetermined priority. One queue (e.g., priority 15, subclass 15, light coding) may be reserved for system controller traffic. The queue tag determines the subclass and the queue for which a cell is destined. The external cell memory 804 is preferably a multiport memory shared between output ports of the cell switch 608. The multiport nature of the external cell memory 804 resides in its role as shared storage for multiple hop locations (i.e., Beam A and Beam B that share a single physical cell switch 608 output port) served by the single OBM controller 802.

The memory provided by the external cell memory 804 may be allocated in a fixed or dynamic manner in several different ways. As one example, one or more queues may be allocated a fixed amount of memory to meet the expected long term needs of the subclass and priority associated with the queue. The remaining memory may then be shared by the remaining queues. To guarantee a minimum bandwidth for each queue, a minimum threshold amount of memory may be reserved for each queue. Thus, the external cell memory 804 permits pairing destination bandwidth needs for a particular destination at a particular time with allocations of queue memory. To that end, the NCC may dynamically uplink to the satellite changes to the manner in which memory is allocated. The thresholds, maximum queue size, minimum queue size, and the like are stored in the pointer memory 816.

The SIC 806 comprises logic that directs the activities of the OBM controller 802, including obtaining cells from the cell switch 608 through the SID 808. As will be described in more detail below, the SIC 806 makes a determination regarding whether the cell should be accepted or rejected using parameters for each queue stored in the pointer memory 816. If a cell is accepted, the SID 808 stores the cell in a queue in the external cell memory 804. The SIC 806 then updates the linked list memory 814 to record where the cell was stored in the external cell memory 804. The SIC 806 also updates the queue statistics memory 812 to reflect the number of cells in each queue in the external memory 804, the number of cells accepted or rejected for each queue, peak queue occupancies, the number of cells pulled from the each queue for transmission, and the number of threshold failure cells.

The SIC 806 and SID 808 handle retrieval of cells from the external cell memory 804 under in accordance with a schedule stored in the downlink schedule table 810. In particular, the downlink schedule table 810 specifies for each frame parameters such as code selection, power gating, cell selection, and the like. The structure of the downlink schedule table 810 is described in detail below with regard to FIGS. 13–16.

FIG. 8 also illustrates CPU 828 control over the scheduling table 810. As one example, the CPU 828 may monitor and collect queue statistics, provide for transmission of the statistics to the NCC, and receive scheduling table updates in the uplink in response. The updates may reflect, for example, current and expected connections and connection types (e.g., in order to service given queues at given rates to match expected traffic characteristics).

The CPU 828 may itself make such changes to the scheduling table 810 by executing the NCC scheduling table modification algorithms onboard the satellite, thereby resulting in more timely updates to the scheduling table and improved network quality of service.

The RSEs 818 and 820 apply a Reed-Solomon block code (e.g., a (236, 212) block code) to cells retrieved for transmission. The IEA 822 subsequently interleaves, scrambles, and convolutionally codes the block coded cells. To that end, for example, the convolutional code may be a ¾ rate constraint length 7 punctured convolutional code for light coded cells, and a ⅜ rate constraint length 7 punctured convolutional code for heavy coded cells. The DLF 826 then forms, preferably, a two payload downlink frame for the downlink, including overhead information (e.g., synchronization codes, code identifiers, guard time, and the like). Each payload may independently carry 12 heavy coded cells or 24 light coded cells.

Additional details of the frame format, coding, interleaving, and scrambling may be found in, U.S. patent application Ser. No. 09/599,040, filed Jun. 21, 2000, entitled "Downlink Beam Hopping Waveform" which application is incorporated herein by reference in its entirety.

Figure 9:
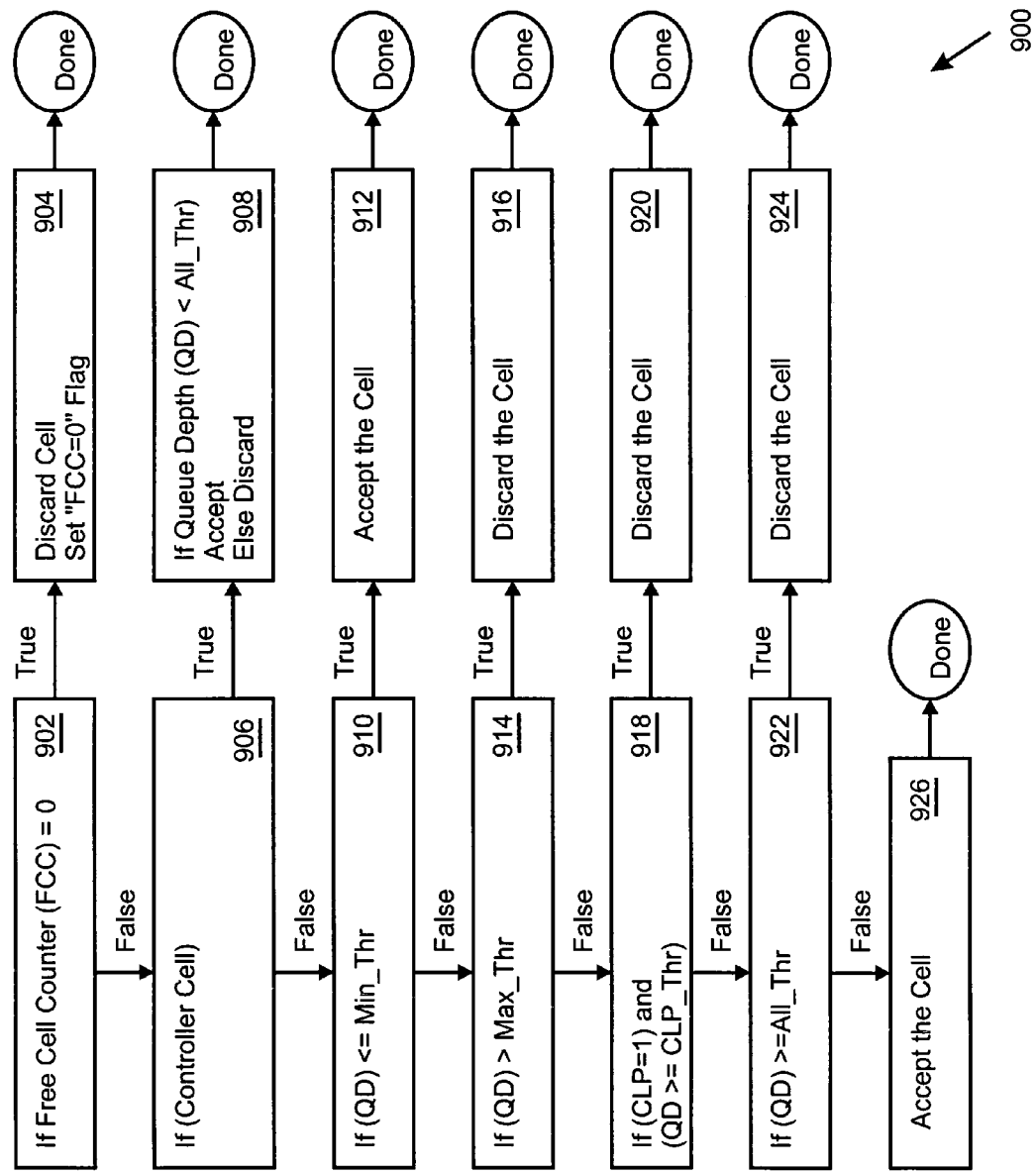
FIG. 9 shows a cell discard algorithm for fixed partition buffers.

As noted above, the SIC 806 makes a determination regarding whether a cell retrieved from the cell switch 608 should be accepted or rejected using parameters for each queue stored in the pointer memory 816. Turning now to FIG. 9, a flow diagram 900 presents a series of determinations made by the SIC 806 when queue are fixed in size. At step 902, the SIC 806 determines whether there is any free memory in which to store the cell. If the free cell counter (FCC, i.e., the total buffer size minus the number of queued cells) is zero, the cell is discarded (step 904). Otherwise the SIC 806 determines if the cell is a controller cell (step 906). A controller cell, for example, may be a cell that carries command, configuration, or status information from the NCC to the satellite (e.g., to update the routing table 702 or downlink scheduling table). If the cell is a controller cell, and if the associated queue depth (QD) is less than its maximum size (i.e., the All_Thr), then the cell is accepted, otherwise it is discarded (step 908).

Continuing at step 910, if the queue depth is less than or equal to the minimum threshold queue size (Min_Thr) then the cell is accepted (step 912). Step 914 checks to see if the queue depth is greater than the maximum allowed queue size (Max_Thr), and if so the cell is discarded (step 916). Beginning at step 918 the SIC 806 may accept or discard the cell based on the Cell Loss Priority (CLP) field found, for example, in an ATM Cell.

A CLP of zero indicates that the cell is of high priority and should not be dropped during periods of high congestion. A CLP of one indicates that the cell is of low priority and should be dropped, if needed, during periods of high congestion. At step 918, if the cell is low priority, and the queue depth is greater than the cell loss priority threshold (CLP_Thr), then the cell is discarded (step 920). If (step 922) the queue depth is greater than All_Thr, then the cell is discarded (step 924). Otherwise, the cell is accepted (step 926).

Figure 10:
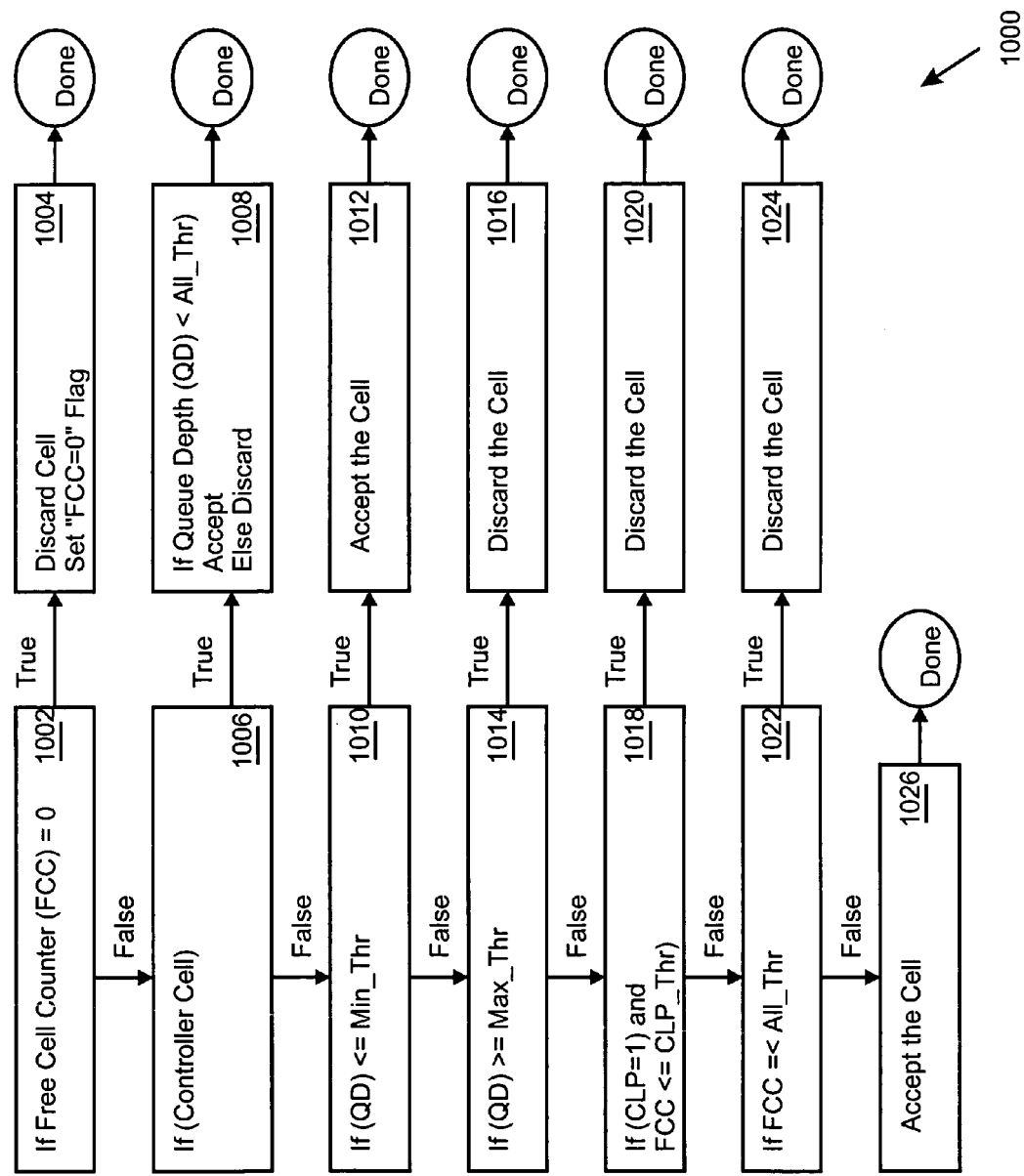
FIG. 10 shows a cell discard algorithm for dynamically buffered queues.

When queues are allocated memory in a dynamic fashion, the SIC 806 follows the steps indicated in FIG. 10 to determine whether a cell is to be accepted. In particular, at step 1002, the SIC 806 determines whether there is any free memory available to store the cell. If the free cell counter (FCC) is zero, the cell is discarded (step 1004). Otherwise the SIC 806 determines if the cell is a controller cell (step 1006). If so, if the queue depth (QD) is less than All_Thr, then the cell is accepted, otherwise discarded (step 1008).

Continuing at step 1010, if the queue depth is less than or equal to the minimum threshold queue size (Min_Thr) then the cell is accepted (step 1012). Step 1014 checks to see if the queue depth is greater than the maximum allowed queue size (Max_Thr), and if so the cell is discarded (step 1016). At step 1018 the SIC 806 may accept or discard the cell based on the CLP. If the cell is low priority, and the amount of free memory is less than or equal to the cell loss priority threshold (CLP_Thr), then the cell is discarded (step 1020). If (step 1022) the amount of free memory is less than All_Thr, then the cell is discarded (step 1024). Otherwise, the cell is accepted (step 1026).

The pointer memory 816 stores the thresholds referred to above, including the All_Thr, Min_Thr, Max_Thr, CLP_Thr, and FCC for each queue.

Figure 11:
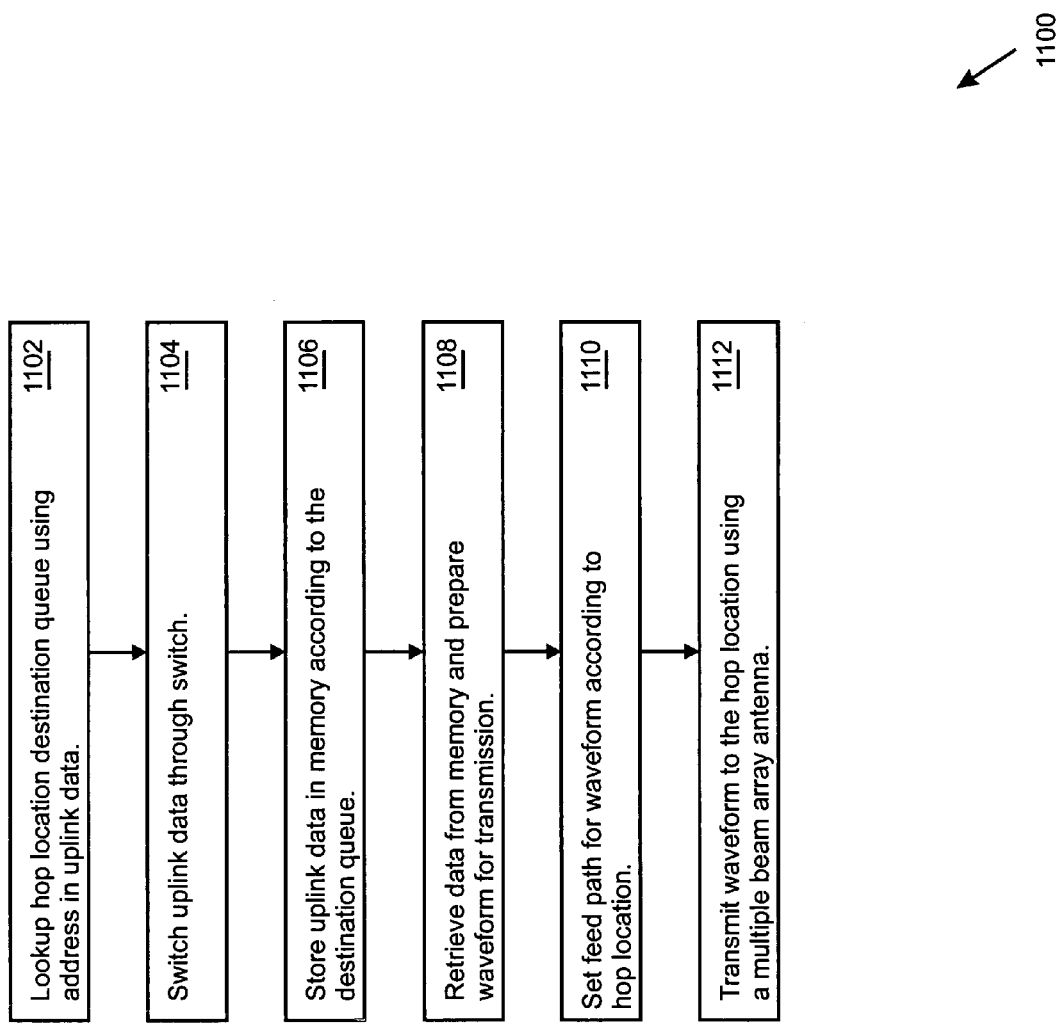
FIG. 11 illustrates a method for routing data through a satellite to a selected downlink hop location.

FIG. 11 summarizes a method 1100 for routing data through a satellite to a selected downlink hop location. At step 1102, the satellite looks up a hop location destination queue using an address carried in the uplink data. Next, at step 1104, the satellite switches the uplink data through a switch, and stores (step 1106) the data in the appropriate queue.

In building frames for transmission, the satellite, at step 1108, first retrieves data from the queue in order to build the downlink waveform. The satellite then selects a feed path for the waveform according to its destination hop location (step 1110). The waveform is transmitted (step 1112), preferably using a multiple beam array antenna with feed elements assigned to the hop locations.

Returning again to the external cell memory 804, its shared nature allows a queue to grow in size to handle bursts of traffic. In addition, dynamic buffers allow the NCC to accept connections whenever shared memory is available to allow a queue to grow. On the other hand, a fixed partition buffer must be checked to determine if it has any room left for cells generated by the new connection. Bandwidth available only at a different priority level nevertheless denies the connection. The shared memory approach, however, allows the appropriate priority level queue to grow in size to handle the connection. Network and queue management functions therefore tend to be less complex and more efficient.

It is also noted that the external cell memory 804 may also include a queue dedicated to controller cells. The downlink scheduling table services the controller cells by placing them in a controller buffer (as opposed to preparing them for transmission in a downlink frame), for example, 32 or 64 cells in size. One or more control elements may then access the controller buffer, decode commands in the cell, and perform those commands. As an example, a controller cell may direct an inbound module to replace entries in the routing table 702.

Figure 12:
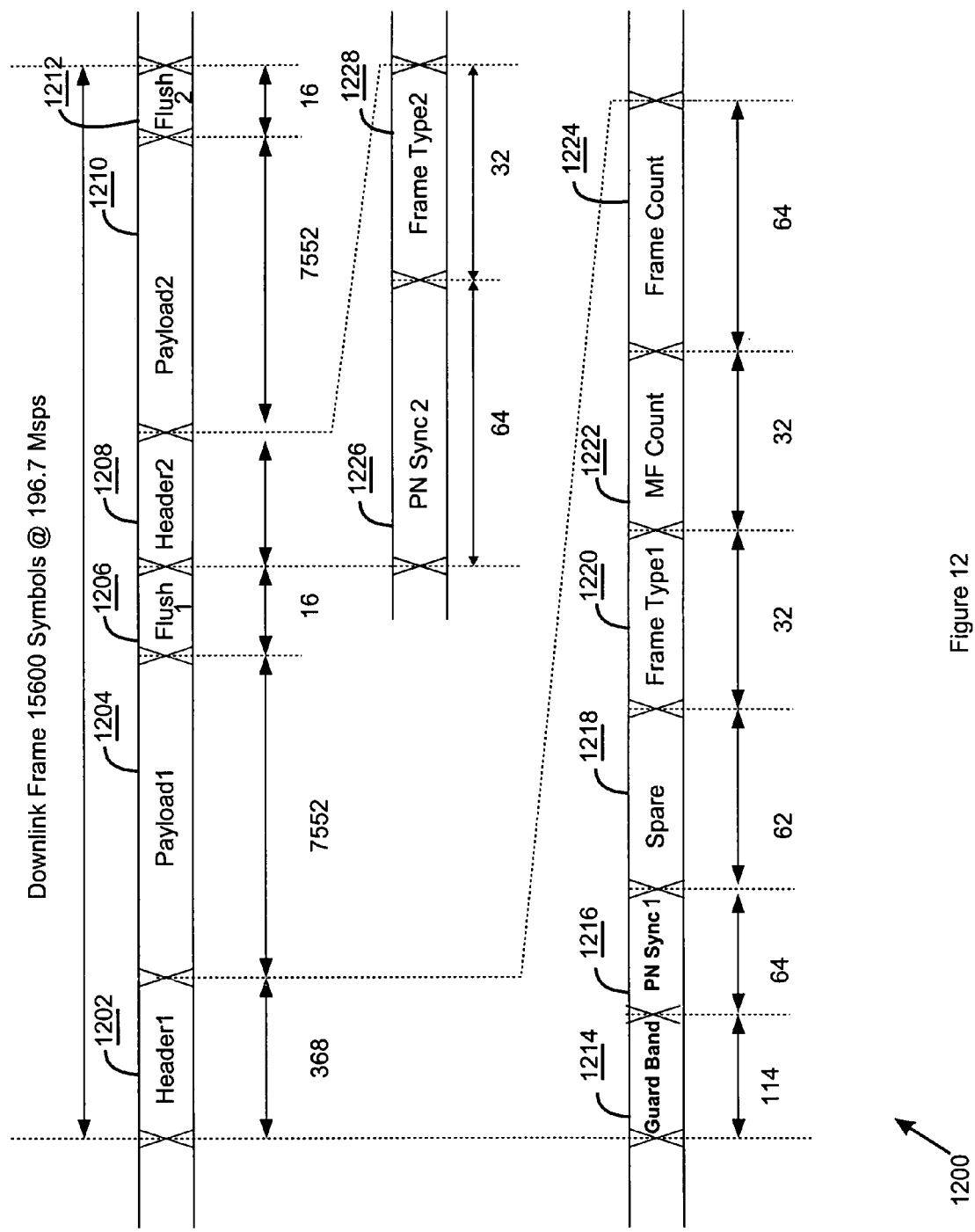
FIG. 12 shows a preferred embodiment of a downlink frame.

FIG. 12 shows a preferred embodiment of a downlink frame signal 1200 suitable for power gating as discussed above. The frame signal 1200 includes a first header field 1202 followed by a first payload field 1204 and a first flush field 1206. In addition, the frame signal 1200 includes a second header field 1208 followed by a second payload field 1210 and another flush field 1212. The first header field 1202, first payload field 1204, first flush field 1206, second header field 1208, second payload field 1210, and second flush field 1212 are all encapsulated into the single frame 1200.

Continuing with reference to FIG. 12, the first header field 1202 is composed of several subfields. In particular, the first header field 1202 includes a hopping beam guard band 1214, a first payload pseudorandom noise (PN) synchronization field 1216, and a spare field 1218. The first header field 1202 also includes a first frame type field 1220, a masterframe count field 1222, and a subframe count field 1224.

The second header section includes a smaller set of subfields, namely, the second PN synchronization field 1226 and the second frame type field 1228.

Table 1, below, shows the preferred length and modulation of each field. Symbols are preferably transmitted at 196.7 megasymbols per second.

TABLE 1

| Field | Symbols | Modulation |
|---|---|---|
| first header 1202 | 368 | |
| hopping beam guard band 1214 | 114 | BPSK |
| first payload PN synch 1216 | 64 | BPSK |
| spare 1218 | 62 | BPSK |
| first frame type 1220 | 32 | BPSK |
| masterframe count 1222 | 32 | BPSK |
| subframe count 1224 | 64 | BPSK |

TABLE 1-continued

| Field | Symbols | Modulation |
|---|---|---|
| first payload 1204 | 7552 | QPSK |
| first flush 1206 | 16 | QPSK |
| second header 1208 | 96 | |
| second payload PN synch 1226 | 64 | BPSK |
| second frame type 1228 | 32 | BPSK |
| second payload 1210 | 7552 | QPSK |
| second flush 1212 | 16 | QPSK |
| TOTAL LENGTH | 15600 | |

The hopping beam guard band 1214 provides, in the preferred embodiment, approximately 580 ns of guard time. In general, however, the length of the hopping beam guard band 1214 is selected to encompasses an expected circuit switching downlink beam hopping delay. The downlink beam hopping delay represents a worst case estimate of the amount of time that the satellite needs to redirect a downlink beam (i.e., "hop" the beam) to a different geographic area.

The first PN synchronization field 1216 and the second PN synchronization field provide synchronization bits for earth terminals. As will be explained in more detail below, a single PN synchronization sequence generator is used to provide an identical PN sequence for both PN synchronization fields 1216, 1226. The subframe count field 1224 counts individual frames as they are transmitted. Preferably, the subframe count field 1224 includes a 16 bit downlink frame count appended with 8 zeros and convolutionally encoded with a relatively heavy (e.g., ⅜ rate) code. The masterframe count field 1222 increments at the start of every masterframe (e.g., every 9328 frames). The masterframe count rolls over after reaching its maximum value (0xFFFFFFFF), although it may be reset or preprogrammed at any time.

The spare field 1218 may be drawn from to provide subsequent enhancements to the frame 1200 (e.g., additional synchronization bits). Preferably, the spare field 1218, the hopping beam guard band 1214, and first PN synchronization field 1216 are filled with PN bits that are generated by a PN synchronization sequence generator discussed below.

The first frame type field 1220 generally indicates characteristics of the first payload field 1204, while the second frame type field 1228 generally indicates characteristics of the second payload field 1210. Several examples of codes for the first and second frame type fields 1220, 1228 are illustrated below in Table 2.

TABLE 2

| Frame Type | Uncoded Value | Coded Value |
|---|---|---|
| Light Coding | 110 | 00111100 |
| Heavy Coding | 011 | 10010110 |
| Frame Gate | 001 | 10100101 |
| Power Gate | 000 | 11110000 | where the coded values may result from the application of an (8, 4) Reed-Muller block code.

Although the light coding, heavy coding, and power gating options are with reference to a payload itself, the frame gate option indicates power gating of an entire frame (i.e., all 15600 symbols). Each coded value is preferably repeated four times in the frame type field. For example, a frame type of 00111100 00111100 00111100 00111100 in the first frame type field 1220 indicates that the first payload field 104 is lightly coded. As another example, a frame type of 11110000 11110000 11110000 11110000 in the second frame type field 1228 indicates that the second payload field 1210 will be power gated. When a frame or payload field is power gated, only a small fraction of the ordinary output power will be generated in the downlink beam during for the entire frame, or during the identified payload(s).

With regard to the heavy coding and light coding, as examples, a lightly coded payload may indicate ¾ rate, constraint length 7, punctured convolutional coding of 1416 Reed-Solomon block coded bytes. A heavily coded payload may indicate a ⅜ rate, constraint length 7, punctured convolutional coding of 708 Reed-Solomon block coded bytes. Thus, the first and second payload fields remain the same size (7552 symbols) under both coding rates.

The first and second payload fields 1204, 1210 carry the billable data to the earth terminals. The first and second payload fields 1204, 1210 are typically concatenated coded using an inner convolutional code. The, the first and second flush fields 1206, 1212 are provided as a convenient way for the earth terminal convolutional decoders to reset their state in preparation for the next payload.

The frame signal 1200 delivers multiple payloads (in the preferred embodiment, two payloads) in a single frame. Although a first header field 1202 is provided as well as a second header field 1208, the second header field 1208 is smaller than the first header field 1202. In particular, the second header field does not repeat the hopping beam guard band 1214 (since the receiver(s) for the first and second payload fields 1204, 1210 are in the same beam spot for the current hop location), spare field 1218, masterframe count 1222 and subframe count 1224 (since only one count is needed for the single multiple payload frame).

As a result, the frame 1200 delivers two payloads in a single frame with less overhead than would be incurred by transmitting two single payload frames. Throughput is therefore higher. The specific frame 1200 shown in FIG. 1 may be generalized to a single N payload N header frame, under the general condition that the sum of the overhead arising from the N headers is less than the sum of the overhead arising from N individual single payload frames.

Figure 13:
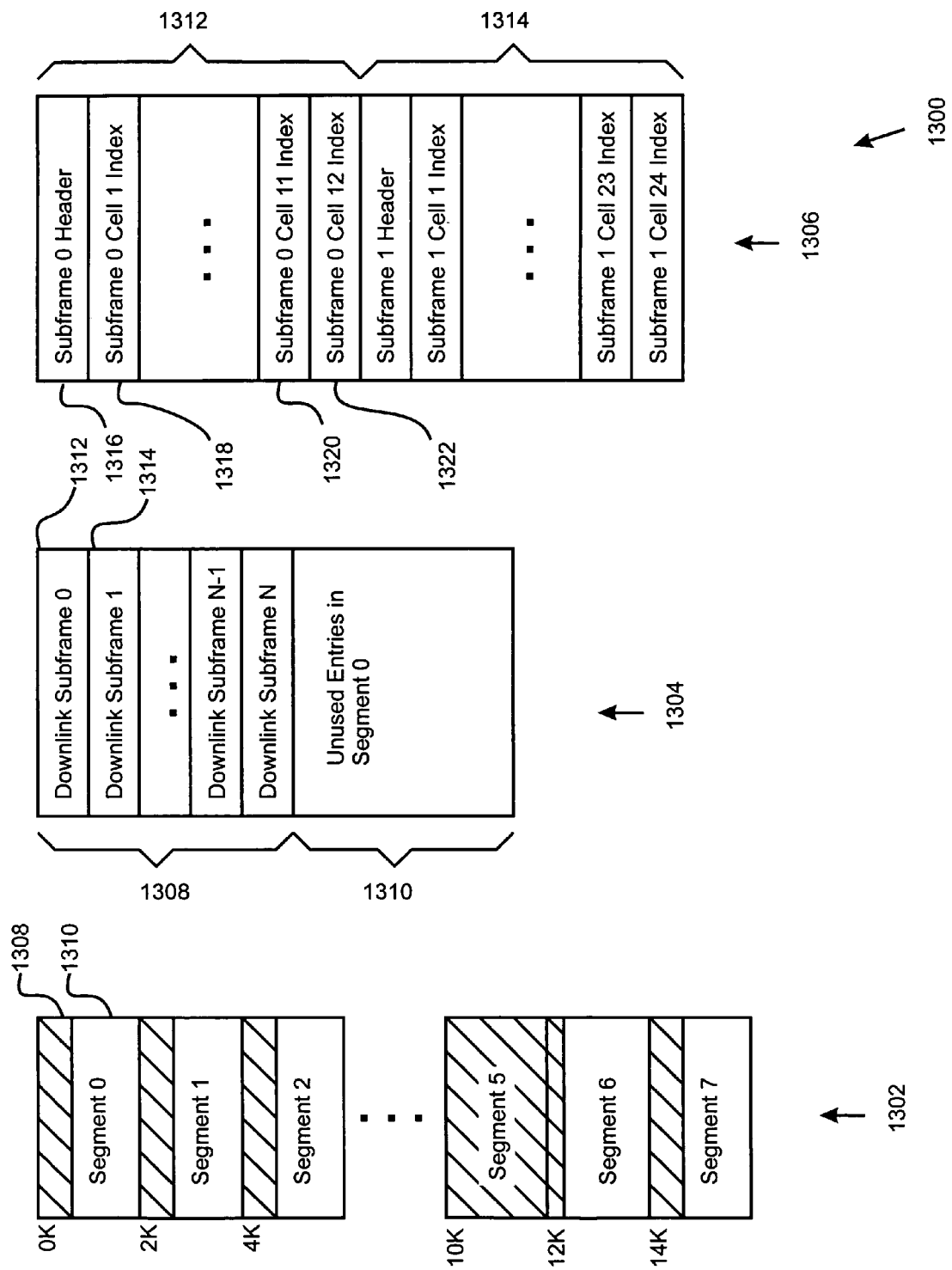
FIG. 13 shows an implementation of a downlink scheduling table.

Turning next to FIG. 13, an implementation 1300 of the downlink scheduling table 810 is illustrated. In particular, FIG. 13 shows a set of scheduling segments 1302, the subframe scheduling entries in a segment 1304, and a detailed view of the subframe definition fields 1306 that compose the scheduling entries in the single segment 1304.

In one implementation, the scheduling table 810 includes 16,384 16-bit words partitioned into the scheduling segments 1302. For example, FIG. 13 shows eight 2,048 word segments labeled Segment 0–Segment 7. Each segment includes scheduling entries for building frames, and may include unused entries for future expansions, modifications, and revisions to the segment. One segment at a time is active, and the NCC may thereby change downlink scheduling with a command that determines which segment is active, or by uplinking new entries for any of the segments.

In general, there is a scheduling entry for each subframe (i.e., each payload) in the frame signal 1200. In other words, the first scheduling entry 1312 dictates the composition of the first payload field 1304 and the second scheduling entry 1314 dictates the composition of the second payload field 1310 for the first frame. For the second frame, the next two scheduling entries are consulted, and for the Nth frame, the N−1$^{th}$ and Nth scheduling entries are consulted. The entries are then read again starting with the first scheduling entry 1312 and second scheduling entry 1314 (i.e., for frame N+1). A frame with additional or fewer payloads would have correspondingly additional or fewer scheduling entries per frame.

The scheduling entries 1312 and 1314 are shown in more detail as the subframe definition fields 1306. In particular, the scheduling entry 1312 is comprised of a subframe header 1316, and 12 subframe cell indices, three of which are indicated as 1318, 1320, and 1322. As will be explained in more detail below, the subframe header 1316 includes information that defines the type of frame to be produced, while each subframe cell index 1318–1322 provides a queue pointer from which a cell is to be pulled for transmission.

In particular, turning to FIG. 14, a subframe header is shown comprising a 5-bit frame offset 1402, a 3-bit beam B payload/frame type 1404, and a 3-bit beam A payload/frame type 1406. The remaining 5 bits remain in reserve for enhancements. Beam A may correspond to a first downlink beam hop location (e.g., the cell 302), while Beam B may indicate a second downlink beam hop location (e.g., the cell 304). The frame offset 1402 points ahead in the segment to the next scheduling entry (i.e., to the next subframe header). In the preferred implementation, the frame offset 1402 is extended to seven bits and ranges from 0 to 127 with step 1. In other embodiments, the frame offset 1402 has a resolution of 4 and ranges from 0 to 124 with step 4, or 248 with step 8. As examples, the beam A and beam B frame type fields may be coded as shown below in Table 3.

TABLE 3

| Frame/Payload Type | Value |
| --- | --- |
| Light Coding | 110 |
| Heavy Coding | 011 |
| Frame Gate | 001 |
| Power Gate | 000 |
| Beam Disabled | 010 |

Light coding indicates that the cells that form the current payload being processed will be lightly coded. As explained above, 24 such cells may be transmitted in a payload. Heavy coding indicates that the cells that form the current payload being processed will be heavily coded. As explained above, 12 such cells may be transmitted in a payload. Frame gate indicates that the entire frame will be power gated (i.e., substantially no energy will be generated in the downlink beam for the entire frame time). Power gate indicates that the current payload under consideration will be power gated. Beam disabled indicates which of the two downlink beam hop locations is currently not receiving downlink beam energy. Absent unusual circumstances, one beam is always disabled (i.e., the downlink beam is serving one cell at a given time).

The Beam A type 1406 and Beam B type 1404 are communicated internally in the OBM controller 802 to direct the type of coding applied and to direct the beam switching process explained above with regard to FIGS. 1 and 2.

Turning next to FIG. 15, a code rate mode subframe cell index 1500 is shown. In particular, the cell index 1500 includes a 4-bit subclass 1502, a 1-bit heavy/light coding indicator 1504, a 4-bit priority 1506, a 1-bit End of Frame (EOF) 1508, and a 1-bit End of Table (EOT) 1510. The subclass 1502, coding indicator 1504, and priority 1506 form a queue pointer that determines a queue from which the OBM controller 802 will pull a cell for transmission. Thus, the entries in the cell indices can be setup to pull cells from any given queue with any given frequency, including the controller queue. Controller cells, however, are placed in the controller buffer as noted above.

The EOF 1508 bit is set in the last cell index for the payload (e.g., after the 24th index for light coding). After EOF, the frame offset 1402 is used to determine the next cell index retrieved. Note that the next cell index may be placed anywhere within range of the frame offset, and not necessarily contiguous with the last index (e.g., to provide evenly spaced indices regardless of heavy or light coding). The EOT 1510 bit is set in the last cell index for the segment itself.

FIG. 16 presents an alternate cell index, namely the fenced mode cell index 1600. In fenced mode, the queues need not be distinguished by heavy or light coding. Thus, there may be, for example, 32 subclasses (rather than 16), with 16 priorities each. One of the queues (e.g., the priority 15 queue in subclass 31) may then be reserved for controller cells. The controller cells may, for example, carry reprogramming information for the segments 1302 to change emphasis on the queue selection to meet bandwidth demands, bandwidth guarantees, and the like.

The fenced mode cell index 1600 includes a 5-bit subclass 1602, a 4-bit priority 1604, a 1-bit End of Frame (EOF) 1606, and a 1-bit End of Table (EOT) 1608. The subclass 1602 and priority 1604 determine a queue from which the OBM controller 802 will pull a cell for transmission. The EOT 1608 and EOF 1606 have the role explained above with respect to the code rate index 1500.

Figure 17:
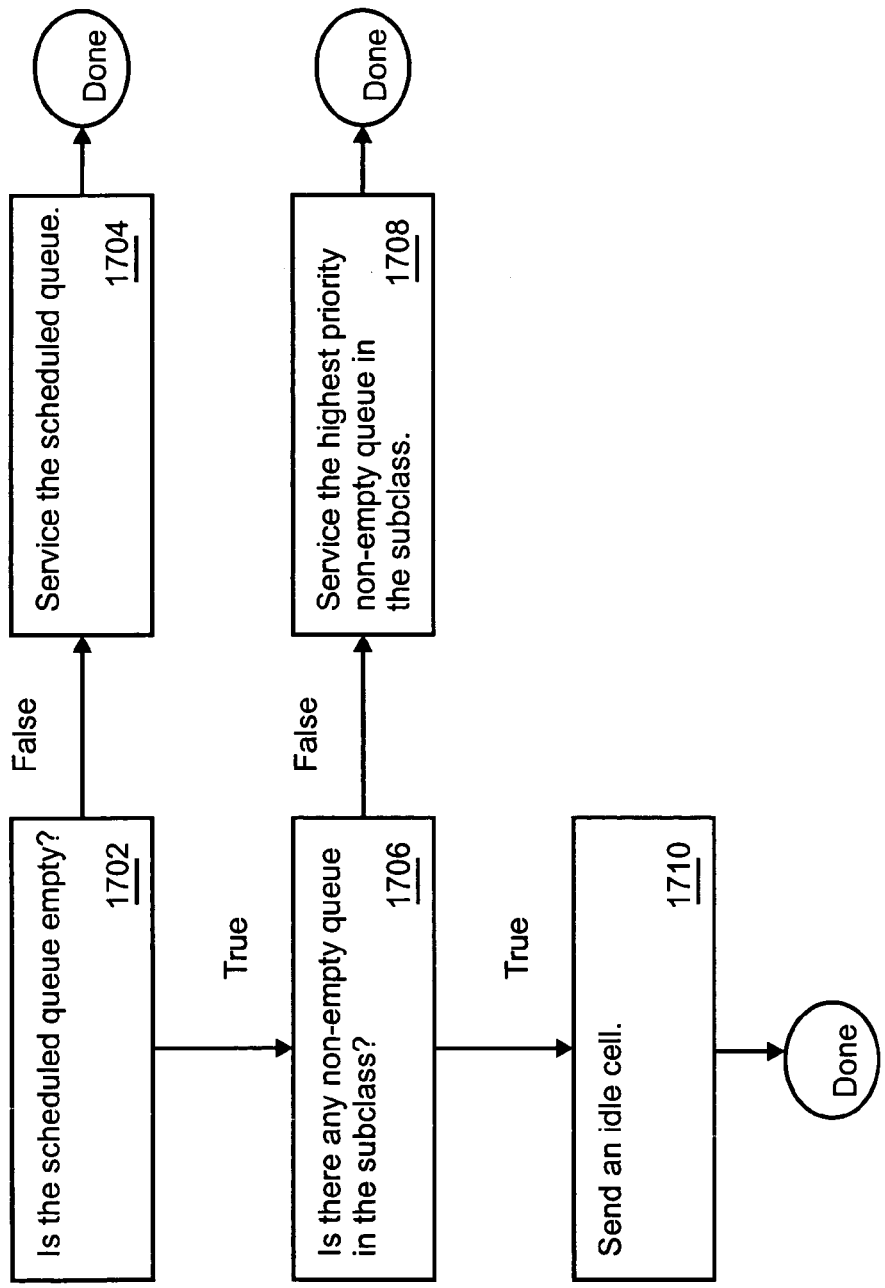
FIG. 17 shows a cell assignment flow diagram for fenced mode.

While the SIC 806 responds to the scheduling table 1300 to retrieve cells from the indicated queues, contingencies exist to handle certain situations. Turning to FIG. 17, for example, a flow diagram 1700 of a cell assignment algorithm for both heavy and light coded subframes (as defined above) is shown (for fenced mode). At step 1702, the SIC 806 determines whether the queue indicated by the queue pointer is empty. If not, the SIC 806 services the indicated queue (step 1704). If so, the SIC 806 determines (step 1706) whether there is any non-empty queue in the same subclass. If so, the SIC 806 services the highest priority non-empty queue (step 1708). Otherwise, the SIC 806 sends an idle or NULL cell (step 1710).

Figure 18:
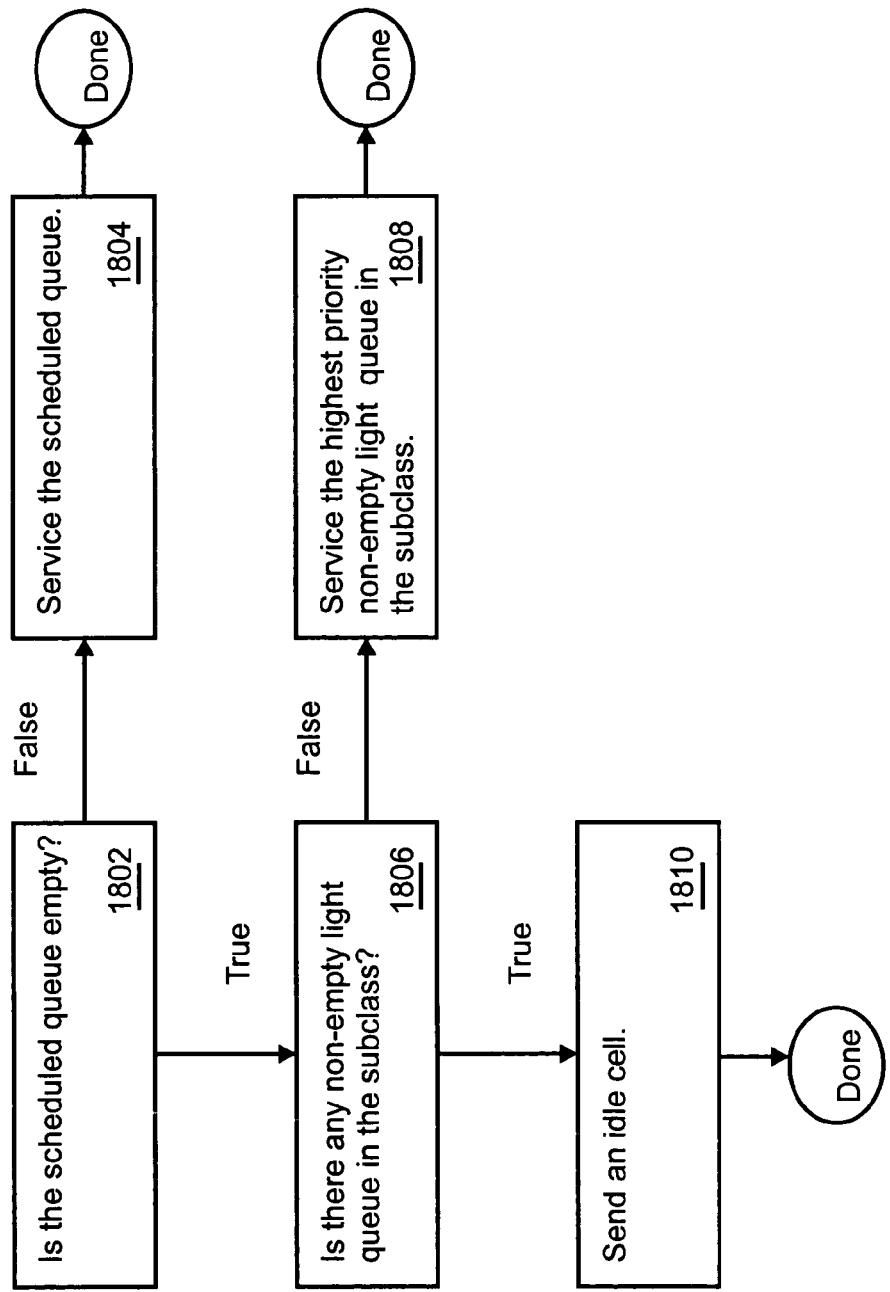
FIG. 18 illustrates a cell assignment flow diagram for code rate mode and a heavy subframe.

FIG. 18, on the other hand, illustrates a flow diagram 1800 for a cell assignment algorithm for a lightly coded subframe in code rate mode. At step 1802, the SIC 806 determines whether the queue indicated by the queue pointer is empty. If not, the SIC 806 services the indicated queue (step 1804). If so, the SIC 806 determines (step 1806) whether there is any non-empty light queue in the same subclass. If so, the SIC 806 services the highest priority non-empty light queue (step 1808). Otherwise, the SIC 806 sends an idle or NULL cell (step 1810).

Figure 19:
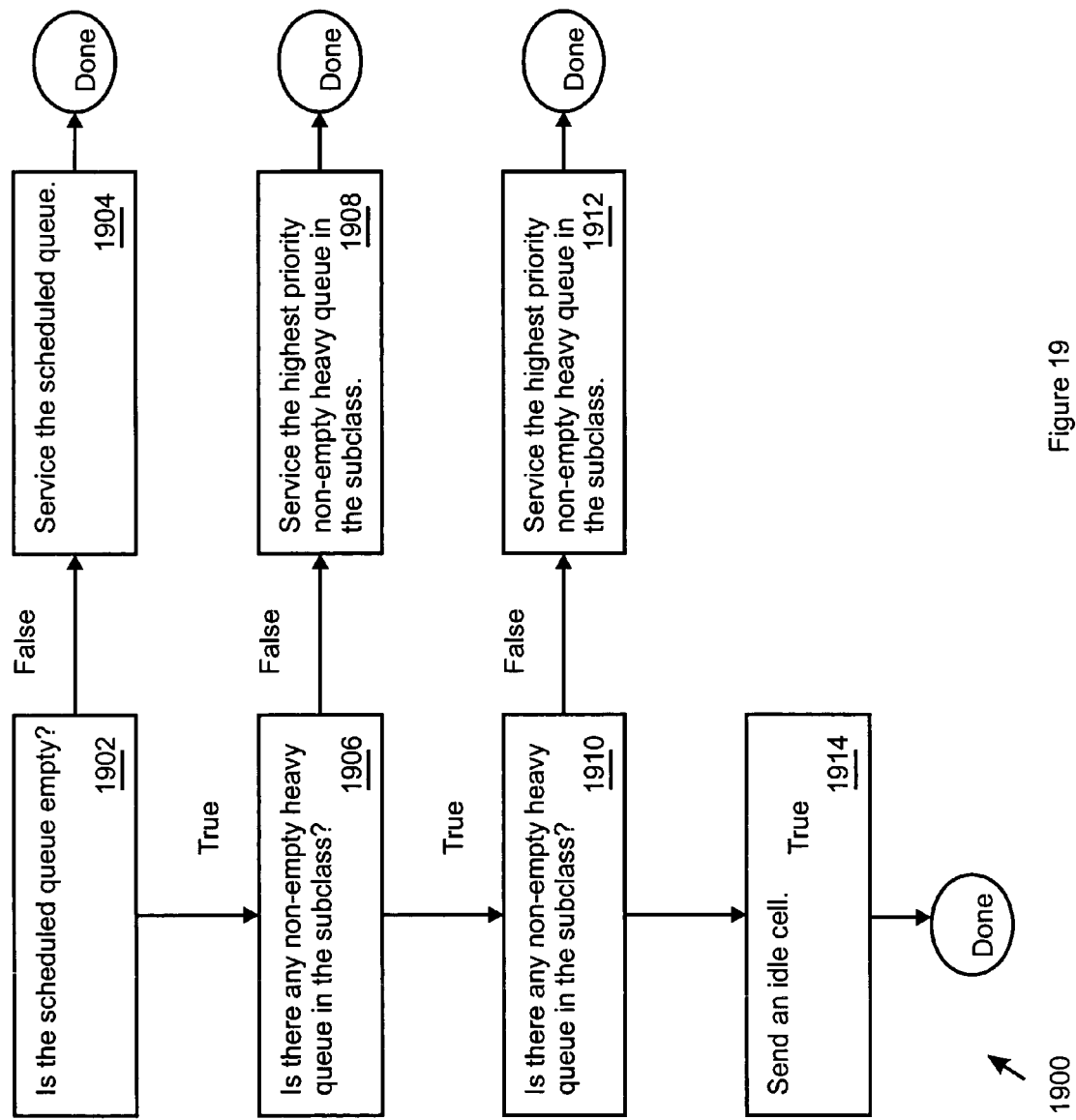
FIG. 19 shows a cell assignment flow diagram for code rate mode and a light subframe.

FIG. 19 illustrates a similar flow diagram 1900 for heavily coded subframes in code rate mode. At step 1902, the SIC 806 determines whether the queue indicated by the queue pointer is empty. If not, the SIC 806 services the indicated queue (step 1904). If so, the SIC 806 determines (step 1906) whether there is any non-empty heavy queue in the same subclass. If so, the SIC 806 services the highest priority non-empty heavy queue (step 1908). If not, the SIC 806 determines (step 1910) whether there is any non-empty light queue in the same subclass. If so, the SIC 806 services the highest priority non-empty light queue (step 1912). In other words, a heavy code may be applied to a cell that was only slated for light coding, to the benefit of the cell. Otherwise, the SIC 806 sends an idle or NULL cell (step 1914).

Thus, the present invention provides a beam hopping self addressed packet switched communication system with locally intelligent scheduling. In particular, the communication system provides a reconfigurable downlink frame scheduler that may provide emphasis to any desired queue to meet bandwidth needs, bandwidth guarantees, and the like. The schedule table may include multiple segments that provide minor or major change the way in which the queues are serviced, and the downlink beam formed. The schedule table may be updated dynamically by an NCC, which may also change the currently active segment with a controller cell in the uplink.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A downlink beam frame scheduler comprising:
a memory; and
a schedule table stored in the memory, the schedule table comprising:
a scheduling segment comprising at least one scheduling entry, the scheduling entry comprising a header field defining at least one of a payload and a frame type for at least one of a payload and a frame to be transmitted, and payload data pointers to data in memory to be transmitted in the payload,
wherein the scheduling entry comprises a first payload scheduling entry for the payload in the frame, and wherein the scheduling table further comprises a second payload scheduling entry for a second payload in the frame.

2. The frame scheduler of claim 1 wherein the header field defines a payload type indicative of a coding rate for the payload.

3. The frame scheduler of claim 1, wherein the memory comprises a plurality of scheduling segments for directing preparation of downlink frames.

4. The frame scheduler of claim 1, wherein the scheduling segment comprises a plurality of scheduling entries, each scheduling entry directing preparation of a subsequent downlink frame.

5. The frame scheduler of claim 1, wherein the data are ATM cells.

6. A downlink beam frame scheduler comprising:
a memory; and
a schedule table stored in the memory, the schedule table comprising:
a scheduling segment comprising at least one scheduling entry, the scheduling entry comprising a header field defining at least one of a payload and a frame type for at least one of a payload and a frame to be transmitted, and payload data pointers to data in memory to be transmitted in the payload,
wherein the header field defines a first payload type field for a first payload in the frame and a second payload type field for a second payload in the frame.

7. A downlink beam frame scheduler comprising:
a memory; and
a schedule table stored in the memory, the schedule table comprising:

a scheduling segment comprising at least one scheduling entry, the scheduling ent comprising a header field defining at least one of a payload and a frame type for at least one of a payload and a frame to be transmitted, and payload data pointers to data in memory to be transmitted in the payload, wherein:
the payload data pointers comprise queue pointers;
the queue pointers are indicative of downlink beam hop location;
the queue pointers are further indicative of priority;
the queue pointers are further indicative of code rate; and
the code rate is one of a light and heavy code rate.

8. A downlink beam frame scheduler comprising:
a memory; and
a schedule table stored in the memory the schedule table comprising:
a scheduling segment comprising at least one scheduling entry, the scheduling entry comprising a header field defining at least one of a payload and a frame type for at least one of a payload and a frame to be transmitted, and payload data pointers to data in memory to be transmitted in the payload,
wherein the payload header further defines a frame offset pointing to a subsequent payload header.

9. A downlink beam frame scheduler comprising:
a memory; and
a schedule table stored in the memory the schedule table comprising:
a scheduling segment comprising at least one scheduling entry, the scheduling entry comprising a header field defining at least one of a payload and a frame type for at least one of a payload and a frame to be transmitted, and payload data pointers to data in memory to be transmitted in the payload,
wherein the header field defines a power gated payload type.

10. A downlink beam frame scheduler comprising:
a memory; and
a schedule table stored in the memory, the schedule table comprising:
a scheduling segment comprising at least one scheduling entry the scheduling entry comprising a header field defining at least one of a payload and a frame type for at least one of a payload and a frame to be transmitted, and payload data pointers to data in memory to be transmitted in the payload,
wherein the header field defines a power gated frame type.

11. A downlink frame processing system for a satellite, the frame processing system comprising:
a packet switch routing self addressed uplink data from an input port to an output port;
a memory coupled to the output port, the memory comprising storage for at least two downlink beam hop locations; and
a downlink scheduler coupled to the memory, the downlink scheduler including a downlink schedule comprising at least one scheduling entry, the scheduling entry comprising a header field defining at least one of a payload and a frame type for at least one of a payload and a frame to be transmitted, and payload data pointers into the memory,
wherein the header field defines a first payload type field for a first payload in the frame and a second payload type field for a second payload in the frame.

12. The frame processing system of claim 11 wherein the payload data pointers comprise queue pointers.

13. The frame processing system of claim 11, wherein the queue pointers are indicative of downlink beam hop location.

14. The frame scheduler of claim 13, wherein the queue pointers are further indicative of priority.

15. The frame scheduler of claim 14, wherein the queue pointers are further indicative of code rate.

16. The frame scheduler of claim 15, wherein the code rate is one of a light and heavy code rate.

17. A method for preparing downlink frames for transmission in a satellite downlink, the method comprising:
switching self addressed uplink data from a switch input port to a switch output port;
allocating, in a memory, storage for at least two downlink beam hop locations;
forming downlink frames by processing a downlink schedule comprising at least one scheduling entry, a header field in the scheduling entry defining at least one of a payload and a frame type for at least one of a payload and a frame to be transmitted, and payload data pointers into the memory; and
servicing a light coding queue when a heavy coding queue indicated by a queue pointer is empty;
wherein:
the processing the payload data pointers comprises processing queue pointers;
the processing the queue pointers comprises processing queue pointers indicative of downlink beam hop location;
the processing the queue pointers comprises processing queue pointers indicative of priority; and
the processing queue pointers comprises processing queue pointers indicative of code rate.

18. The method of claim 17, wherein the allocating includes allocating a first downlink beam hop location queue and a second downlink beam hop location queue.

19. The method of claim 17, wherein the processing includes processing an active one of a plurality of scheduling segments storing the downlink schedule.

20. The method of claim 19, further comprising deallocating the active one of the plurality of scheduling segments and activating a different one of the the plurality of scheduling segments.

21. The method of claim 17, further comprising the step of servicing a different queue when a scheduled queue indicated by a queue pointer is empty.

\* \* \* \* \*